United States Patent [19]

Matsuda et al.

[11] Patent Number: 4,846,651

[45] Date of Patent: Jul. 11, 1989

[54] INJECTION MOLDING MACHINE

[75] Inventors: Kazuo Matsuda, Kyoto; Nobuaki Inaba, Yokohama; Masashi Kaminishi, Osaka; Tetsuji Funabashi; Nobukazu Tanaka, both of Hirakatashi, all of Japan

[73] Assignee: Kabushiki Kaisha Komatsu Seisakusho, Tokyo, Japan

[21] Appl. No.: 138,385

[22] PCT Filed: Mar. 27, 1987

[86] PCT No.: PCT/JP87/00193

§ 371 Date: Nov. 20, 1987

§ 102(e) Date: Nov. 20, 1987

[87] PCT Pub. No.: WO87/05854

PCT Pub. Date: Oct. 8, 1987

[30] Foreign Application Priority Data

Mar. 27, 1986 [JP] Japan .................................. 61-067054
Jan. 14, 1987 [JP] Japan .................................. 62-005132
Jan. 19, 1987 [JP] Japan .................................. 62-007999

[51] Int. Cl.⁴ .............................................. B29C 45/77
[52] U.S. Cl. .................................... 425/145; 264/40.3; 425/146; 425/171; 425/562

[58] Field of Search .................... 264/40.3, 40.5, 40.7, 264/328.13; 425/145, 146, 147, 149, 171, 562, 563

[56] References Cited

FOREIGN PATENT DOCUMENTS 55-93523  6/1980  Japan .
59-64336  4/1984  Japan .
60-242022 12/1984 Japan .

Primary Examiner—Richard L. Chiesa
Assistant Examiner—Timothy W. Heitbrink
Attorney, Agent, or Firm—Ronald P. Kananen

[57] ABSTRACT

An injection molding machine of the present invention has a flow rate control device (11) located between an injection screw (2) mounted inside a housing (1) so that it may be rotated freely and reciprocated freely and an injection nozzle (12) mounted in the leading end of the housing (1) so as to inject the molten resin into a cavity (14) of a mold (13). The control device serves to control the rate of flow of the molten resin from the injection screw (2) to the injection nozzle (12). The flow rate control device (11) cooperates with an injection speed control device and a dwell pressure control device installed separately to control the flow rate and speed of the molten resin thereby making it possible to control the injection speed rapidly, and with a high accuracy and with an excellent response.

12 Claims, 11 Drawing Sheets

INJECTION MOLDING MACHINE

TECHNICAL FIELD OF THE INVENTION

This invention relates to an injection molding machine arranged to charge molten resin in a mold cavity, and more particularly to an injection molding machine having a device for controlling the injection speed of the molten resin during the charging process thereof and a device for controlling dwell pressure application after the completion of charging of the molten resin.

BACKGROUND TECHNIQUE OF THE INVENTION

There has heretofore been known such an injection molding machine as disclosed, for example, in Japanese Patent Publication No. 57-59060 which is arranged to inject and charge the molten resin in a mold cavity from an injection nozzle by forwardly moving an injection screw mounted so as to be rotatively driven and reciprocated freely in a housing by the action of an injection cylinder located behind the base end of the screw.

Generally, in injection molding machines, it is necessary to control the injection speed of the molten resin to be charged into the mold cavity depending on the position of the injection screw.

The injection speed in the above-mentioned conventional injection molding machine is determined by the travel speed of the injection screw, that is, the speed of expansion of the injection cylinder, and therefore, in order to control the injection speed, there is no alternative to controlling the volume of hydraulic oil to be supplied into the expansible pressure chamber in the injection cylinder depending on the position of the injection screw to vary the speed of expansion of the injection cylinder as disclosed, for example, in Japanese Patent Application Laid-Open Specification No. 59-64337.

However, since there is a time-lag between the time the speed of expansion of the injection cylinder is changed and the time when the speed and flow rate of the molten resin passing through the injection nozzle and flowing into the mold cavity are varied, the injection speed cannot be controlled rapidly and with a high accuracy depending on the position of the injection screw.

Stated in more detail, since the molten resin itself has compressive properties, the travel speed of the injection screw does not always correspond to the injection speed of the molten resin from the injection nozzle. Therefore, there are instances where even though the speed of travel of the injection screw is controlled with a high accuracy, the accuracy of controlling the injection speed cannot be improved and such a control as to obtain a predetermined injection speed corresponding to the position of the injection screw cannot be achieved.

That is, when the injection screw forces the molten resin during, for example, the resin charging process, the pressure of the molten resin within the housing formed in the leading end of the injection screw is raised. Even if the forward movement of the injection screw is stopped in this condition, the compressed molten resin within the housing flows out from the injection nozzle into the mold cavity until its pressure has reduced to the level corresponding to the loading pressure within the mold, and as a result, there occurs some delay in response until the injection speed becomes zero.

Further, in case of rapidly accelerating the speed of travel of the injection screw from the condition wherein said speed has been changed over to thereby rapidly accelerate the injection speed, it is necessary to obtain momentarily the injection speed corresponding to the speed of travel of the injection screw. But, in order to meet this requirement, the pressure of the molten resin in the housing needs also to be increased correspondingly. As a matter of fact, however, there is some time lag until the pressure of the molten resin increases to such a level, and as a result, there is a corresponding delay in response until the injection speed is increased.

Stated concretely, in the case where a product whose shape varies steeply at two places as shown, for example, in FIG. 1 is produced by injection molding, in order to prevent the occurrence of surface imperfection such as haze weld lines etc. due to turbulence in the flow of the molten resin into the mold cavity, it is necessary to obtain an injection speed pattern as shown in FIG. 2 where four stages of injection speed $V_1$, $V_2$, $V_3$ and $V_4$ corresponding, respectively to four positions A, B, C and D of the injection screw as shown. $V_1$ and $V_2$ are set at a low speed, and in order not to produce any flow mark, $V_2$ and $V_4$ are set at a high speed.

In order to control the injection speed in this manner, after detecting the positions A, B, C and D of the injection screw, one set of flow control valves installed in the hydraulic circuit for the injection cylinder is manipulated to change the speed of expansion of the injection cylinder to thereby control the speed of travel of the injection screw as shown by broken line in FIG. 2. But, because of the aforementioned delay in response, the speed of travel of the injection screw is different from the injection speed shown by solid line in FIG. 2 in terms of changing zones in their respective rising and falling zones.

Because of the above-mentioned delay in response of the injection speed relative to the speed of travel of the injection screw, even if the speed of travel of the injection screw is rapidly changed, the injection speed is switched slowly from $V_1$ to $V_2$, and from $V_3$ to $V_4$ thereby forming flow marks on the surface of the product. Also, during the change of speed from $V_2$ to $V_3$ at the time of falling, even if the injection speed is rapidly lowered, the injection speed remains high until the pressure of the molten resin becomes equal to the loading pressure within the mold cavity, and then it is changed over slowly from $V_2$ to $V_3$ thus causing haze weld lines on the product. To prevent this phenomenon, if the speed of travel of the injection screw is changed over at a position just this side of the position B of the injection screw at the time of change of the speed from $V_2$ to $V_3$, then a flow mark is produced.

Further, even if the speed of travel of the injection screw is reduced before the application of a predetermined pressure; that is to say, the application of a dwell pressure to the extending pressure chamber of the injection cylinder after the completion of charging of the molten resin in order to prevent the occurrence of a molding sink due to the solidification of the molten resin, a peak value V' will occur by the inertia due to the loading on the motor and so forth which is exerted on the injection screw thus forming a flash or flashes on the product.

One of the examples of the conventional devices for controlling dwell pressure application is also disclosed in the above-mentioned Japanese Patent Application Laid-open Specification No. 59-64336.

According to this device for controlling dwell pressure application, the dwell force to be applied to the mold is changed over by forwardly moving the injection screw and charging the molten resin successively into the injection mold at a predetermined pressure while the injection pressure is being changed over stepwise depending on the position of the injection screw, detecting the position of the injection screw by means of a position detector after the completion of the filling and thereby decelerating the speed of forward travel of the injection screw and at the same time reducing stepwise the pressure to be applied to the injection cylinder connected to the injection screw by means of a timer.

In such a device for controlling dwell pressure application, even though the movement of the injection screw is stopped and the pressure in the expansion pressure chamber of the injection cylinder is changed over to a preset pressure in order to keep the injection molding machine under dwell condition, if compressed molten resin remains in the leading end of the injection screw, the pressure of the resin cannot reach the preset dwell force momentarily by the injection force of a motor and so forth applied to the injection screw. In other words, the pressure of the molten resin reaches the preset value with short time lag, and also a peak pressure occurs in the beginning of change-over to the dwell pressure application process thus causing charging of an excess amount of molten resin into the mold cavity, the so-called, overchange.

As a result, an excessive dwell pressure force is exerted on the molten resin prior to the solidification thereof thus forming flashes on the molded product at locations thereof which correspond to the terminal ends and round halves of the mold to be charged with the molten resin.

In order to prevent the occurrence of the above-mentioned initial peak pressure, it is envisaged to put forward the position of the injection screw at the time of switch-over of the dwell pressure. However, by so doing, the change-over to the dwell pressure application process occurs while the mold cavity is not charged completely with the molten resin. As a result, the rate of flow of the resin to be charged into the terminal ends of the mold will drop so that the product is liable to have flow marks formed on the surface thereof.

Further, when the dwell pressure is changed stepwise after the pressure of the molten resin has been changed over to the dwell condition, a time lag occurs between the time of rising and that of falling, and the pressure gradient at the time of rising and falling cannot be controlled. For this reason, there are cases where a steep pressure gradient is required depending on the shape of the product to be obtained, whilst in some cases, a slow pressure gradient is required. However, since such control cannot be effected, molded products sometimes have flashes and/or flow marks.

SUMMARY OF THE INVENTION

The present invention has been devised in view of the above-mentioned situation of the conventional injection molding machine, and has for its first object to provide an injection molding machine which enables the flow rate and speed of the molten resin injected from the injection nozzle to be controlled without any time delay after the detection of the position of the injection screw and which enables the injection speed to be controlled rapidly and with a high accuracy.

Another object of the present invention is to provide an injection molding machine provided with an injection speed control device having a remarkably improved response in the injection speed relative to the speed of travel of the injection screw without being affected by the compressive properties of the molten resin in the injection speed changing zones i.e., injection speed rising and falling zones.

A still further object of the present invention is to provide an injection molding machine provided with a dwell pressure control device to ensure that it is not influenced by the inertia force of the motor and so forth exerted on the injection screw and no peak pressure occurs in the dwell pressure force in the mold cavity in the beginning of the dwell pressure application process.

To achieve the above-mentioned objects of the present invention, according to the present invention, there is provided an injection molding machine including a flow rate control device located between one injection screw mounted inside a housing so that it may be rotated freely and reciprocated freely by an injection piston cylinder unit and one injection nozzle mounted in the leading end of the housing so as to inject the molten resin into the mold cavity, said control device serving to control the rate of flow of the molten resin from said injection screw to said injection nozzle.

Further, according to the present invention, there is provided an injection molding machine characterized in that said flow rate control device comprises a portion having a slender hole formed in the leading end of said housing so as to connect an intermediate hole formed in the housing and in which said injection screw is inserted with said injection nozzle; a nozzle valve located in the intermediate part of the slender hole and mounted rotatably in the housing; an actuator for rotatively driving said nozzle value so as to control the area of opening of said slender hole to increase and decrease it, and means for connecting the actuator with said nozzle valve.

Still further, according to the present invention, there is provided an injection molding machine, characterized in that the degree of opening of said nozzle valve is controlled by an injection speed control device, said control device comprising an injection screw position detector connected with the piston rod of said injection position cylinder unit; an injection screw travelling speed detector connected with the piston rod; and a controller for controlling the drive of said actuator while comparing the detection signals generated by these two detectors, which are respectively, a preset injection screw position signal and a preset injection screw travelling speed signal.

Furthermore, according to the present invention, there is provided an injection molding machine, characterized in that it comprises further a dwell pressure control device adapted to transmit a control signal to said flow rate control device so that when said injection screw is located at a preset position, said nozzle valve has a preset degree of opening and to effect control so that when the degree of opening of the nozzle valve has reached the preset value, the pressure in the expansible pressure chamber of said injection position cylinder unit reaches a preset dwell pressure The above-mentioned and other advantages, manners and objects of the present invention will be apparent to those skilled in the art from the following description and accompanying drawings in which preferred embodiments corresponding to the principle of the present invention are shown by way of examples as well as the explanation of the scope of the claims thereof.

EXPLANATION OF THE BEST MODE OF THE INVENTION

The first to seventh embodiments of an injection molding machine according to the present invention will now be described below with reference to FIGS. 3 to 16.

In the following description, the injection screw will be referred to simply as the screw, the injection nozzle as the nozzle, and the injection piston.cylinder unit as the injection cylinder.

Figure 1:
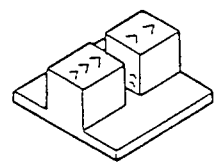
FIG. 1 is a schematic perspective view of a product obtained by injection molding using a conventional injection molding machine.
Figure 2:
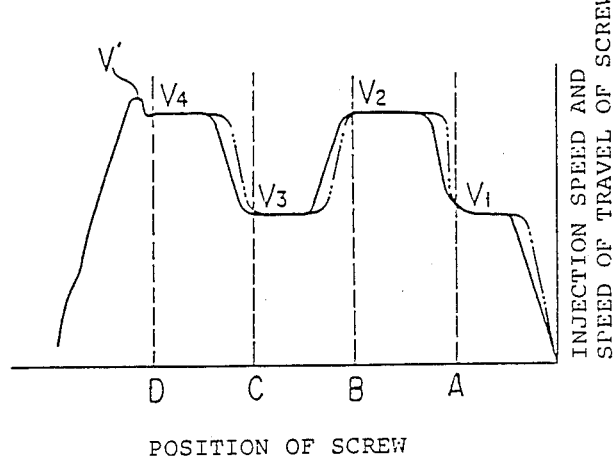
FIG. 2 is a graph showing the relationship between the position of the injection screw, the speed of travel thereof, and the injection speed in the conventional injection molding machine.
Figure 3:
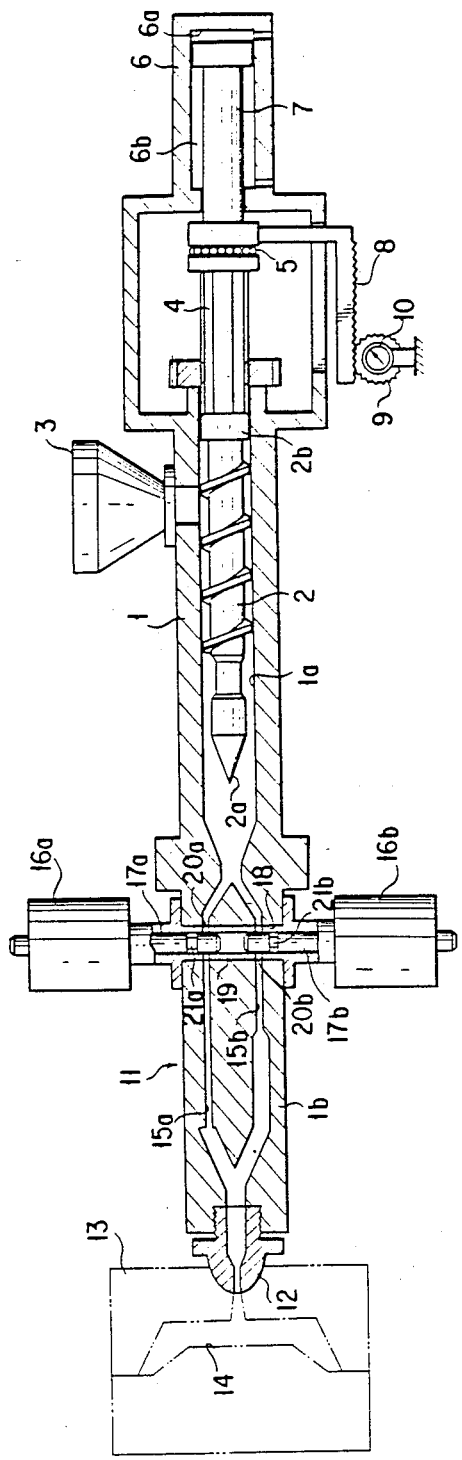
FIG. 3 is a schematic overall configurational sectional view of one embodiment of an injection molding machine according to the present invention.

In FIG. 3 showing the overall configuration of the first embodiment, a screw 2 is inserted slidably and rotatably within an intermediate hole 1a formed in a housing 1, and also the leading end 2a of the screw 2 is of a conical shape, and the rear end 2b thereof has a large diameter so as to prevent the molten resin inside a hopper 3 from leaking to the rear side. The rear end 2b is connected to a spline shaft 4. This spline shaft 4 is connected through a thrust bearing 5 to a piston rod 7 mounted in an injection cylinder 6. Further, the spline shaft 4 is connected to a rotary drive source, not shown.

A rack rod 8 is connected to the above-mentioned piston rod 7, and a pinion 9 which meshes with the rack rod 8 is connected with a rotary sensor 10 constituting a mechanism for detecting the position of the screw 2. The above-mentioned intermediate hole 1a is connected through a flow rate control arrangement 11 to a nozzle 12 which communicates with a cavity 14 formed in a mold 13.

The above-mentioned flow rate control arrangement 11 is adapted to restrict slender holes 15a and 15b, which connect the intermediate hole 1a with the nozzle 12, by spools 17a and 17b which can be moved in and out by proportional action solenoids 16a and 16b, respectively.

In other words, the leading end portion 1b of the housing 1 is formed with first and second slender holes 15a and 15b which connect the intermediate hole 1a with the nozzle 12 and which differ in length, and also formed with a transverse hole 18 which extends at right angles with the first and second slender holes 15a, 15b. Fitted in this transverse hole 18 is a sleeve 19 in which the first and second spools 17a and 17b are inserted. This sleeve 19 has the first and second proportional action solenoids 16a and 16b secured to both ends thereof so that the first and second spools 17a and 17b may slidably move by a stroke which varies with the input electric current through the solenoids 16a, 16b. The sleeve 19 is formed with first and second holes 20a and 20b which connect the first and second slender holes 15a and 15b, and the first and second spools 17a and 17b are formed with first and second constricted parts (or recessed parts of a small diameter) 21a and 21b, respectively, so as to increase and decrease the area of opening of the first and second slender holes 15a and 15b.

Therefore, even if the speed of expansion of the injection cylinder 6, that is to say, the amount of the hydraulic oil to be supplied into the expansible pressure chamber 6a remains constant to keep the speed of travel of the screw 2 constant, if the value of electric current to be supplied to the first and second proportional action solenoids 16a and 16b is changed to vary the degree of restriction of the first and second small diameter holes 15a, 15b, the speed and rate of the molten resin to be supplied to the nozzle 12 can be varied.

Accordingly, detecting the position of the screw 2 by the detection signal generated by the aforementioned rotary sensor 10 and controlling the strength of the electric current supplied to the first and second proportional position action solenoids 16a and 16b by means of a controller (not shown) depending on the position of the screw 2, the injection speed can be controlled. Further, since the time lag which occurs from the time when the throttling effect of the slender holes 15a and 15b is varied until the time when, the speed and flow-rate of the molten resin passing through the nozzle 12 are varied is extremely small, and actually negligible, the injection speed can be controlled rapidly and with a high accuracy.

Further, the purpose of provision of the first and second slender holes 15a and 15b of different lengths is to control the speed and rate of flow of the molten resin to the nozzle 12 more accurately, but it is of course possible to provide only one small diameter hole.

Next, the charging operation of the molten resin will be explained. The screw 2 is rotated by a driver means, not shown, so as to assume a predetermined metering position S' so that the molten resin within the housing 1 may be metered at a predetermined value. Subsequently, the first and second solenoids 16a and 16b are supplied with an electric current to allow the first and second spools 17a and 17b to block the first and second slender holes 15a and 15b, respectively, and at the same time, the pressurized hydraulic oil is supplied into the expansible pressure chamber 6a of the injection cylinder 6 so as to move the screw 2 to push the molten resin. Thus, the molten resin is compressed to prevent it from being subjected to cushion or elastic deformation.

Figure 4:
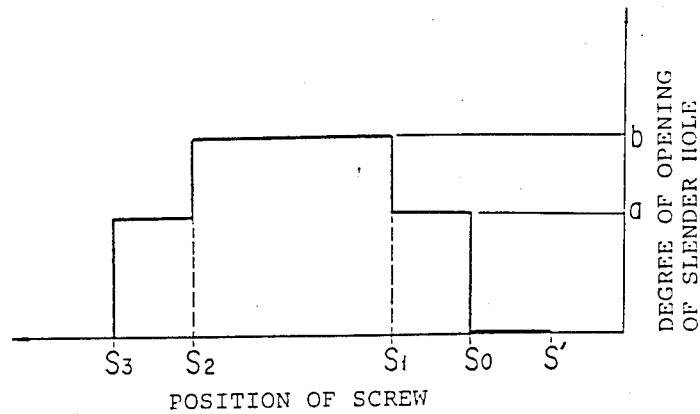
FIG. 4 is a graph showing the relationship between the degree of opening of the slender holes and the position of the injection screw in the injection molding machine shown in FIG. 3.

Upon completion of this compression, the position $S_0$ of the screw 2 which is the origin is set to the controller, and at the same time, the first and second proportional action solenoids 16a and 16b are supplied with an electric current so that the area of opening of the first and second slender holes 15a and 15b may have the value denoted by (a) in FIG. 4.

When it has been detected that the screw 2 is located at a position S', the first and second proportional action solenoids 16a and 16b are supplied with an electric current so that the area of opening of the first and second slender holes 15a and 15b may have the value denoted by (b) in FIG. 4, when the screw 2 has reached a position $S_2$, the first and second proportional action solenoids 16a and 16b are supplied with an electric current so that the area of opening of the first and second slender holes 15a and 15b may have the value (a) in FIG. 4. When the screw 2 has reached its stroke end $S_3$, the first and second slender holes 15a and 15b are blocked.

By effecting such a control, errors in the position of the screw 2 due to the elastic deformation of the molten resin and the flow rate and speed of the molten resin to be injected can be absorbed so that the control of injection of the molten resin can be made with a high accuracy.

Upon completion of charging of the molten resin into the cavity 14 of the mold 13, the piston rod 7 of injection cylinder 6 is extended by a constant pressure applied thereto so as to apply a dwell pressure to the molten resin.

Figure 5:
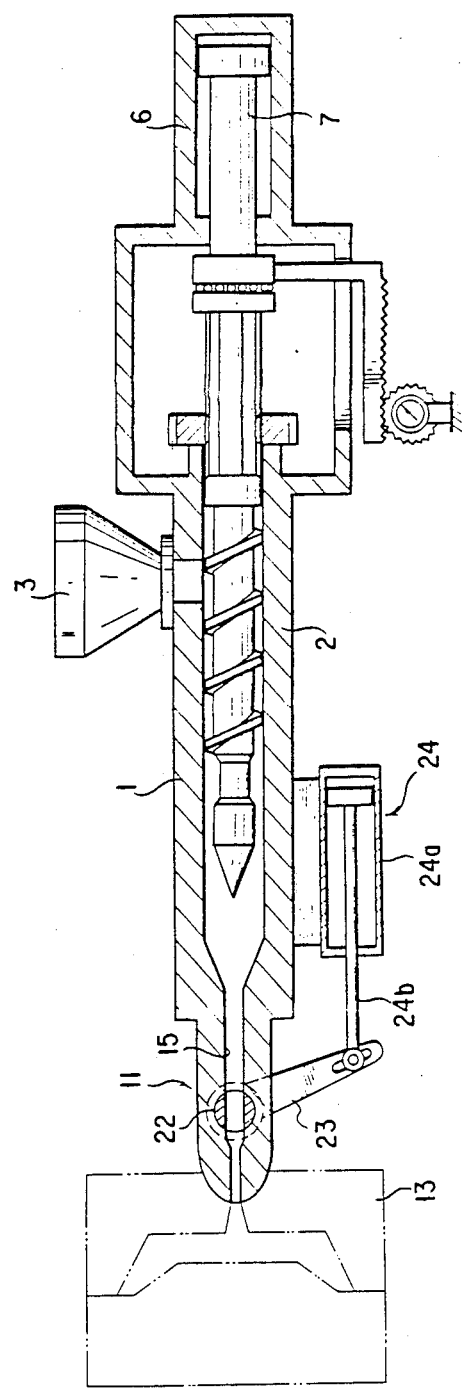
FIG. 5 is a schematic overall configurational sectional view of a second embodiment of an injection molding machine according to the present invention.

As shown in FIG. 5, the above-mentioned flow rate control arrangement 11 may be arranged such that a rotary nozzle valve 22 is mounted in the intermediate part of the slender hole 15 and the nozzle valve 22 is connected through a lever 23 to a pneumatic or hydraulic oil piston cylinder unit 24 having a cylinder 24a and a piston rod 24b so that the rotary nozzle valve 22 may be rotated by the piston-cylinder unit 24 through the lever 23 to thereby increase and decrease the area of opening of the slender hole 15.

Although in the above-mentioned examples the arrangement is made such that the injection speed is controlled stepwise, it is not to be limited to this mode of control, and stepless control can be made so that the injection speed may be kept slow in the initial stage, fast in the intermediate stage, and slow in the last stage.

Figure 6:
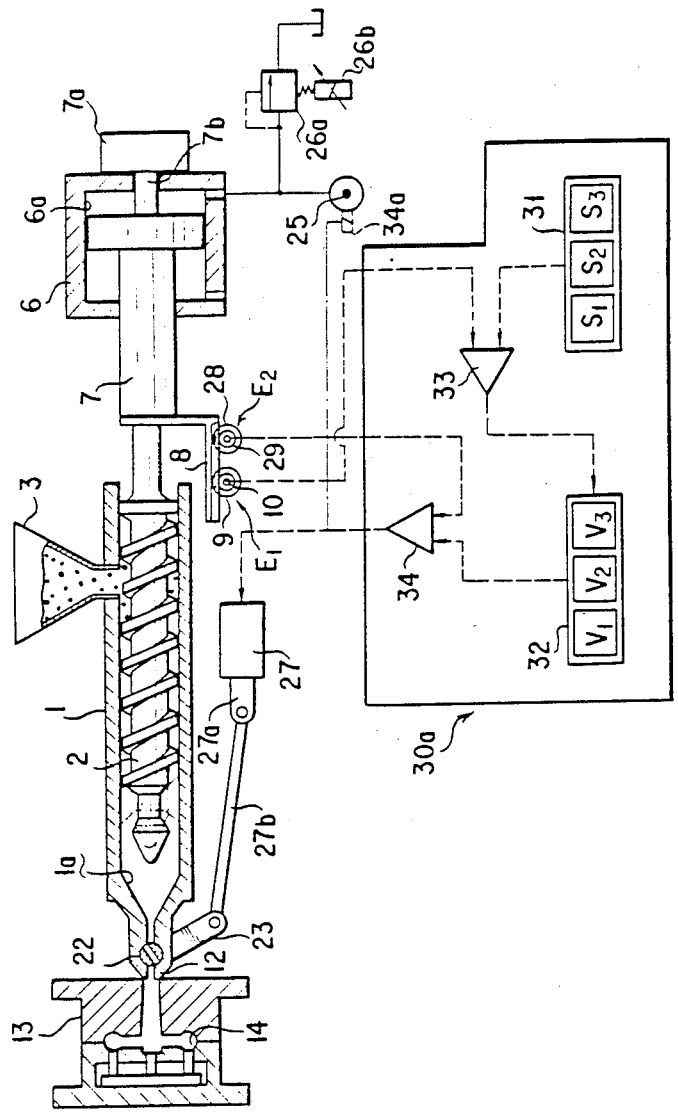
FIGS. 6, 7 and 8 are overall schematic configuration explanatory views showing third, fourth and fifth embodiments, respectively, of an injection molding machine of the present invention.
Figure 7:
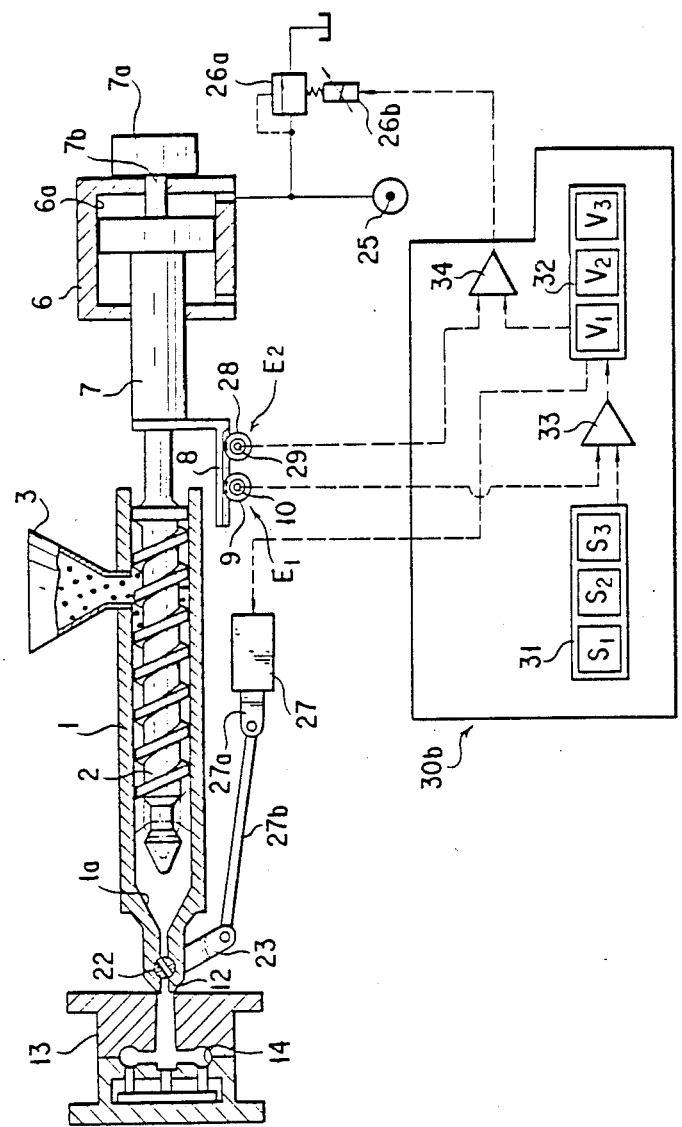
Figure 8:
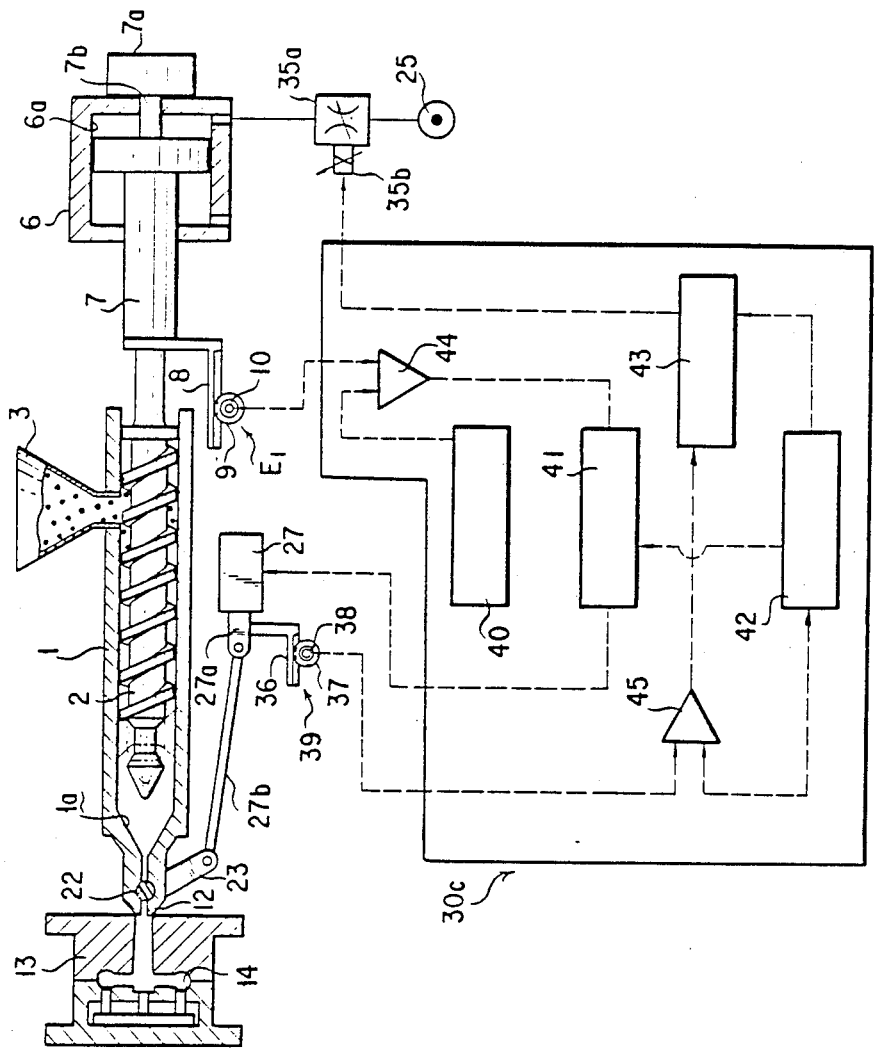

Next, the third, fourth and fifth embodiments of the present invention are shown in FIGS. 6, 7 and 8, respectively.

Further, the parts in FIGS. 6, 7 and 8 which are indicated by the same reference numerals as those used in FIGS. 3 and 5 illustrating the above-mentioned first and second embodiments are the same components having the same functions, and therefore the description of them is omitted herein to avoid duplication of explanation.

In FIG. 6 which is the schematic overall configuration explanatory view of the third embodiment of the present invention, a drive shaft 7b arranged to be rotated by, for example, a hydraulic motor etc. is connected by spline with the piston rod 7 in the injection cylinder 6. The arrangement is made such that the fluid under pressure is supplied from a pressurized fluid supply source 25 through a control valve, not shown, into the expansible pressure chamber 6a in the injection cylinder 6, and the pressure of the fluid is controlled by a pressure control valve 26a.

The above-mentioned nozzle 12 has a flow rate control means for controlling the area of opening thereof, for example, the nozzle valve 22 mounted therein. The nozzle valve 22 is connected through a lever 23 and a rod 27b to a nozzle valve driver means, for example, a proportional action solenoid 27. The arrangement is made such that by controlling the electric current to be supplied to the proportional action solenoid 27, the degree of opening of the nozzle valve 22 can be varied so as to control the area of opening of the nozzle 12.

A rack rod 8 is connected to the aforementioned piston rod 7, and a pinion 9 which meshes with the rack rod 8 is provided with a rotary sensor 10 such as, for example, a potentiometer thus constituting a rack position detector $E_1$. And, another sensor 28 meshing with the aforementioned rack rod 8 is provided with a rotary pulse generator 29 thus constituting a screw speed detector $E_2$.

And, the injection speed is controlled by a controller 30a.

The above-mentioned controller 30a comprises means 31 for setting a position of the screw, means 32 for setting injection speed, a position comparator 33 and a speed comparator 34. The means 31 for setting a position of the screw can be set at any desired screw position for changing over the injection speed, whilst the means 32 for setting injection speed can be set at any desired one of a plurality of injection speeds corresponding to the abovementioned preset position of the screw.

The control operation of the injection speed of the molten resin in the third embodiment having the above-mentioned configuration is as follows.

The pressurized fluid is supplied at a constant pressure into the expansible pressure chamber 6a of the injection cylinder 6 while the set pressure for the pressure control valve 26a is kept constant so as to extend the piston rod 7 to move the screw 2 forward thereby compressing the molten resin in the internal part 1a formed in the leading end side of the screw 2 in the housing 1 to charge the resin from the nozzle 12 into the cavity of the mold 13. Further, reference numeral 7a denotes a rotary driver means for the screw 2, but it is not always located at the position shown.

Since, during this period, the pressure within the expansible pressure chamber 6a is kept constant, the compression pressure of the molten resin in the internal part 1a is kept constant and the injection speed is determined by the degree of opening of the nozzle valve 22. When the degree of opening of the nozzle valve 22 is large, the injection speed becomes high, whilst the degree of opening thereof is small, the injection speed becomes low.

Stated in brief, when the degree of opening of the nozzle valve 22 is large, the resistance to the passage of the molten resin through the nozzle 12 is reduced so that the screw 2 may travel fast to increase the injection speed, whilst the degree of opening of the nozzle valve 22 ia large, the resistance to the molten resin passing through the nozzle 12 is increased so as not to allow the screw 2 to travel fast thus reducing the injection speed.

Further, at this time, in order to reduce the driving energy from the pressurized fluid supply source 25, by connecting the speed comparator 34 with the member 34a for varying the amount of pressurized fluid to be discharged from the fluid supply source as shown by one dot chain line, the amount of the pressurized fluid to be discharged from the fluid supply source can also be controlled to reduce the amount of the fluid to be relieved from the pressure control valve 26a.

In brief, the amount of the pressurized fluid to be discharged from the fluid supply source 25 is the sum of the amount of the fluid required to obtain an injection speed and the amount of the fluid to be relieved, and if the speed of travel of the screw 2 is slow, the amount of the fluid required to obtain the injection speed is reduced, resulting in a corresponding, increase in the amount of the fluid to be relieved. Therefore, at that time, the amount of the fluid to be discharged from the fluid supply source is controlled so as to reduce the amount of the fluid to be relieved.

Moreover, the actual position of the screw detected by the screw position detection $E_1$ is compared with the screw position set at the screw position detector 31 by means of the position comparator 33, and if the correspondence of the two values is obtained, a read-out signal is transmitted by the comparator 33 to the means 32 for setting injection speed. The injection speed corresponding to the abovementioned screw position preset by the setting means 32 is transmitted to the speed comparator 34 where it is compared with the actual speed of travel of the screw detected by the screw travel speed detector $E_2$. Until the correspondence of the preset and detected values is obtained, control electric current is supplied to the proportional action solenoid 27 to control the degree of opening of the nozzle valve 22 to increase and decrease.

In brief, in case the actual speed of the screw is faster than the preset injection speed, the degree of opening of the nozzle valve 22 is reduced, whilst in case the former is slower than the latter, the degree of opening of the nozzle valve 22 is increased.

As described hereinabove, since the injection speed is controlled by varying the degree of opening of the nozzle valve 22, the delay in response to the screw travel speed in the changing zones in rising and falling of injection pressure can be minimized to an extremely small value to thereby enable the injection speed to be reduced and increased rapidly. Therefore, the molded product can be free from flow marks and haze weld lines and also when the nozzle valve 22 is closed, the molten resin is not allowed to flow into the cavity 14 of the mold 13, and so when applying a dwell pressure neither peak pressure nor flashes occur.

Further, since the pressure within the extensible pressure chamber 6a of the injection cylinder 6 is kept constant and the pressure to push the molten resin is also kept constant so as to keep the pressure of the molten resin in the internal part 1a constant, the delay in response due to a compression or pressure drop of the molten resin encountered in the conventional injection molding machine can be eliminated so that the injection speed may be increased and decreased rapidly. Also the position and speed of the screw may be controlled more accurately than the conventional molding machine.

Moreover, because the pressure of the molten resin in the internal part 1a of the housing 1 is kept constant, the differential pressure between the front and rear of a check valve 2a mounted on the leading end of the screw 2 is always kept constant so that the amount of the molten resin leaking from this check valve 2a may be kept constant to enable a highly accurate control to be made.

FIG. 7 shows the fourth embodiment which is arranged such that the means 32 for setting injection speed located in the controller 30b may transmit or output an electric signal to the proportional action solenoid 27 to allow the nozzle valve 22 to have a degree of opening corresponding to the present injection speed. Also, the injection speed preset by the means 32 for setting injection speed is compared by means of the speed comparator 34 with the actual speed of travel of the screw detected by the screw travel speed detector $E_2$, and a control signal to eliminate the deviation between the two values is transmitted by the comparator 34 to the pressure setting unit 26b of the pressure control valve 26a to thereby control the set pressure to increase and decrease.

For example, in case the actual speed of travel of the screw is faster than the present injection speed, the pressure set for the pressure control valve 26a is lowered so as to reduce the pressure within the expansible pressure chamber 6a of the injection cylinder 6 to reduce the force to push the molten resin by the screw 2 to thereby reduce the pressure of the resin in the internal part 1a and reduce the injection speed thereby reducing the actual speed of travel of the screw until it corresponds with the preset injection speed. Whilst, when the actual speed of travel of the screw is slower than the preset injection speed, the pressure set for the pressure control valve 26a is raised so as to raise the pressure within the expansible pressure chamber 6a of the injection cylinder 6 to increase the force to push the molten resin by the screw 2 to thereby increase the pressure of the resin in the internal part 1a and increase the injection speed thereby increasing the actual speed of travel of the screw until it corresponds with the preset injection speed.

By this arrangement, the pressure of the pressure control valve 26a needs to be controlled only by the amount corresponding to the speed for pushing the screw 2. Therefore, it is not required to apply an unnecessarily high fluid pressure force to enable the driving energy from the pressurized fluid supply source 25 to be reduced and an energy saving to be achieved.

FIG. 8 shows the fifth embodiment. In this embodiment, a rack rod 36 fitted to a movable unit 27a of the proportional action solenoid 27 meshes with a pinion 37. The pinion 37 is provided with a rotary sensor 38 such as, for example, a potentiometer or the like thus forming a detector 39 to detect the degree of opening of the nozzle valve. Arrangement is made such that the pressurized fluid is supplied by the pressurized fluid source 25 through a flow rate control valve 35a into the expansible pressure chamber 6a of the injection cylinder 6. Further, a controller 30c comprises means 40 for setting nozzle valve change-over position, means 41 for commanding change-over of the degree of opening of nozzle valve, means 42 for setting the degree of opening of nozzle valve, means 43 for commanding change-over of screw speed, a first comparator 44 and a second comparator 45.

The means 40 for setting nozzle valve change-over position is similar to the aforementioned means 31 for setting screw position, and the means 42 for setting the degree of opening of nozzle valve is similar to the aforementioned means 32 for setting injection speed. The setting means 40 and 42 are arranged to set the position of the screw for changing over the injection speed and the degree of opening of the nozzle valve corresponding to the injection speed, respectively.

The actual position of the screw detected by the screw position detector $E_1$ is compared by means of the first comparator 45 with the nozzle valve change-over position set by the means 40 for setting a nozzle valve change-over position. If and when the coincidence of the two positions is obtained, a signal is transmitted by the comparator 44 to the means 41 for commanding change-over of the degree of opening of nozzle valve. The degree of opening of nozzle valve set by the setting means 42 is read out so as to transmit an electric signal as an output to the proportional action solenoid 27 to vary the degree of opening of the nozzle valve 22 to control the injection speed.

Simultaneously with the above-mentioned operation, a signal is transmitted by the means 42 for setting the degree of opening of nozzle valve to the means 43 for commanding change-over of screw speed. Also, the actual degree of opening of the nozzle valve transmitted by the means 39 for setting the degree of nozzle valve is compared by means of the second comparator 45 with the degree of opening of nozzle valve set by the setting means 42. Until the coincidence of the two values is obtained, a speed change-over command signal is transmitted by the comparator 45 to the means 43 for commanding change-over of screw travel speed.

The means 43 for commanding change-over of screw travel speed serves to identify whether the opening of the nozzle valve is changed over to its closed side, and when it is changed over to the open side, transmit a fluid quantity increase signal to the control unit 35b of the flow rate control valve 35a to thereby control the amount of the fluid to be supplied into the extensible pressure chamber 6a, and when it changed over to the closed side, transmit a fluid quantity decrease signal, to the control unit 35b.

Stated in brief, since the change-over of the opening of the nozzle valve 22 to its open side results in an increase in the injection speed, the amount of the fluid to be supplied into the expansible pressure chamber 6a of the injection cylinder 6 is increased to increase the travel speed of the screw 2, whilst since the change-over of the opening of the nozzle valve 22 to its closed side results in a decrease in the injection speed, the amount of the fluid to be supplied into the expansible pressure chamber 6a of the injection cylinder 6 is reduced to reduce the travel speed of the screw 2.

By so doing, the injection speed can be increased and decreased more rapidly.

Subsequently, the sixth and seventh embodiments of the present invention provided with a dwell pressure control means will be explained below sequentially with reference to FIGS. 9 to 16. Further, since the parts in these drawings indicated by the same reference numerals as those used in the aforementioned embodiments are the same components having the same functions, the explanation of them is omitted in the following description.

Figure 9:
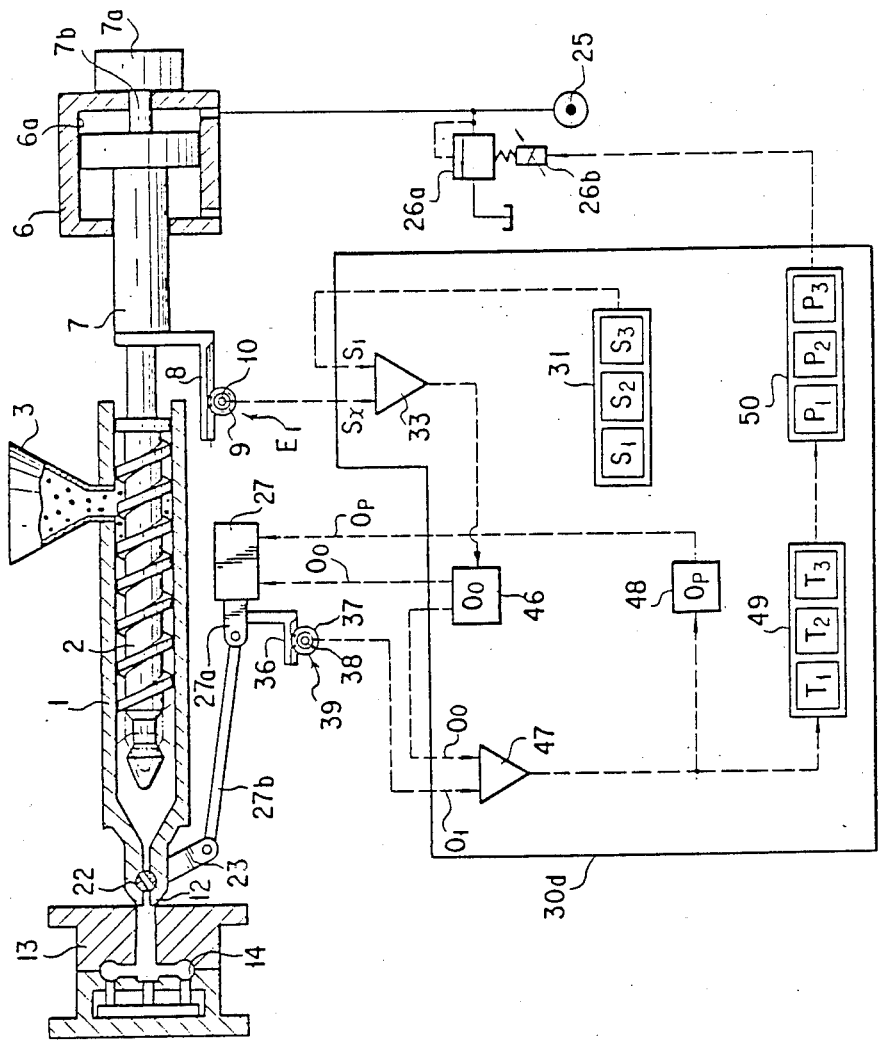
FIG. 9 is an overall schematic configuration explanatory view showing a sixth embodiment of an injection molding machine according to the present invention.

In FIG. 9 which is the schematic overall configurational view of the sixth embodiment, the dwell pressure control is made by the associated operations of a screw position detector $E_1$, a nozzle valve opening detector 39, and a controller 30d.

Therefore, the dwell pressure control device will be described below together with the explanation of the detailed configuration of the controller 30d including the operation thereof.

The actual position $S_x$ of the screw detected by a screw position detector $E_1$ is compared by means of a first comparator 33 with the position $S_1$ of the screw set by the screw position setting means 31 where the dwell pressure application is commenced. When the coincidence of the two positions is obtained, a command signal is transmitted by the comparator 33 to means 46 for setting the degree of opening of the nozzle valve before dwell pressure application so as to supply a preset electric signal to a proportional action solenoid 27 to allow the nozzle valve 22 to have a preset degree of opening $O_0$ before dwell pressure application.

At that time, the actual degree of opening $O_1$ detected by the nozzle valve opening detector 39 is compared with the above-mentioned degree of opening $O_0$ before dwell pressure application by means of a second comparator 47. When the coincidence of the two is obtained, command signals are transmitted by the comparator 47 to means 48 for setting the degree of opening of the nozzle valve during dwell pressure application and means 49 for setting dwell pressure application time.

Thereby, a control electric current is supplied by the means 48 for setting the degree of opening of the nozzle valve during dwell time application to the proportional action solenoid 27 to allow the nozzle valve to have a degree of opening $O_p$ for dwell pressure application.

A command signal is transmitted by the means 49 for setting dwell pressure application means to means 50 for setting dwell pressure so as to supply a control electric current by the latter to the control unit 26b of the pressure control valve 26. This allows the set pressure to reach a preset value so that the pressure of the fluid within the expansible pressure chamber 6a of the injection cylinder 6 may, be varied to change the force to push the screw 2. This enables the pressure of the molten resin in the leading end of the screw 2 to reach the value set by the setting means 50 and also the dwell pressure in the mold to reach the preset value to thereby enable the dwell pressure application to be achieved.

Figure 10:
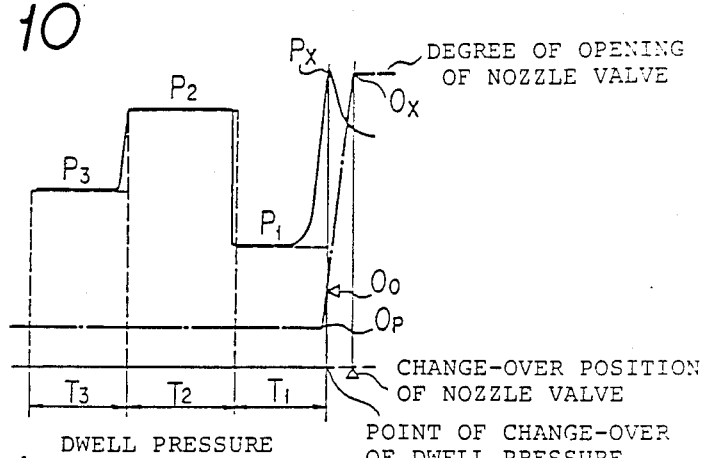
FIGS. 10, 11 and 12 are graphs showing the relationships between the dwell pressure application time and the degree of opening of the nozzle valve, the pressure of the molten resin in the leading end of the injection screw, and the dwell pressure force in the mold cavity, respectively, in the injection molding machine shown in FIG. 9.
Figure 11:
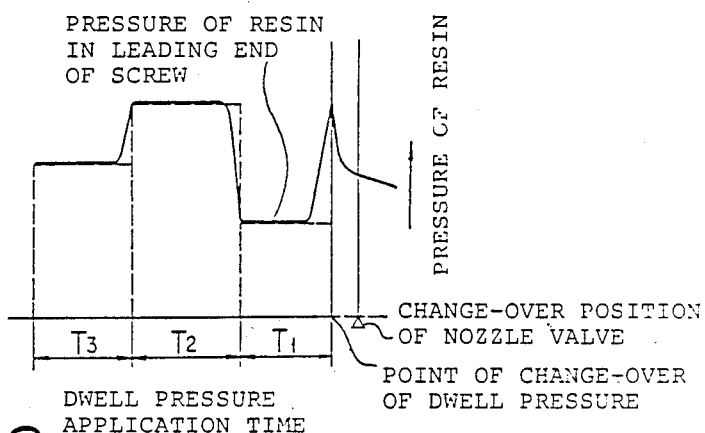
Figure 12:
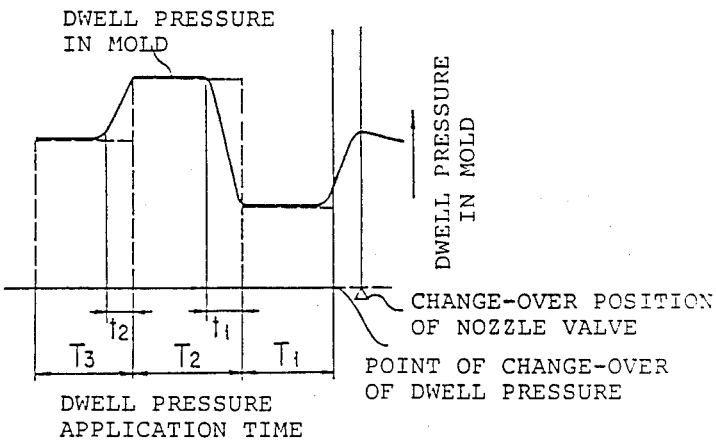

Stated concretely, the pressure of the fluid in the expansible pressure chamber 6a of the injection cylinder 6 varies from $P_1$ to $P_2$ and then $P_3$ as shown by a solid line in FIG. 10, and a peak value $P_x$ occurs at the point of change-over of dwell pressure. Whilst the pressure of the molten resin in the leading end of the screw varies as shown in FIG. 11 and a peak value occurs at the point of change-over of dwell pressure, but since the degree of opening $O_p$ of the nozzle valve 14 is then small, the peak value in the pressure of the molten resin does not affect the dwell pressure in the mold. As a result, no peak value occurs in the dwell pressure in the mold at the point of change-over of dwell pressure shown in FIG. 12.

Since, as mentioned above, the degree opening of the nozzle valve 22 is reduced before the dwell pressure application and thereafter the pressure in the expansible pressure chamber 6a of the injection cylinder 6 is controlled to keep the dwell pressure in the mold at a preset value, the dwell pressure application is made after the area of opening of the nozzle 12 has been reduced. Therefore, even if the screw 2 is moved by its inertia, the resistance to the passage of the molten resin at the leading end of the screw through the nozzle 12 becomes high enough to prevent the molten resin from flowing into the mold cavity thus making it possible to prevent the molten resin from being over-changed into the mold, and also even if a compression of the molten resin at the leading end of the nozzle or peak pressure occurs, it does not give influence to the inside of the mold, the occurrence of flashes on the holes or the point of completion of charging on the molded product can be prevented.

Further, the change-over from the charging process to the dwell pressure application process is made when the degree of opening of the nozzle valve 12 has been reduced sufficiently; that is to say, when the speed of flow of the molten resin into the mold has been reduced sufficiently. Therefore, the timing or point of change-over from the charging process to the dwell pressure application becomes clear by observing the behavior of flow of the molten resin into the mold.

Regarding the change-over of the dwell pressure after the change-over to the dwell pressure application process has been made, the amount of the molten resin to flow through the nozzle valve 22 into the mold during the dwell pressure application can be controlled by restricting the degree of opening of the nozzle valve 22 to $O_p$ as shown in FIG. 21 so that the time $t_1$, $t_2$ at the time of rising and falling of the dwell pressure in the mold may be controlled.

Figure 13:
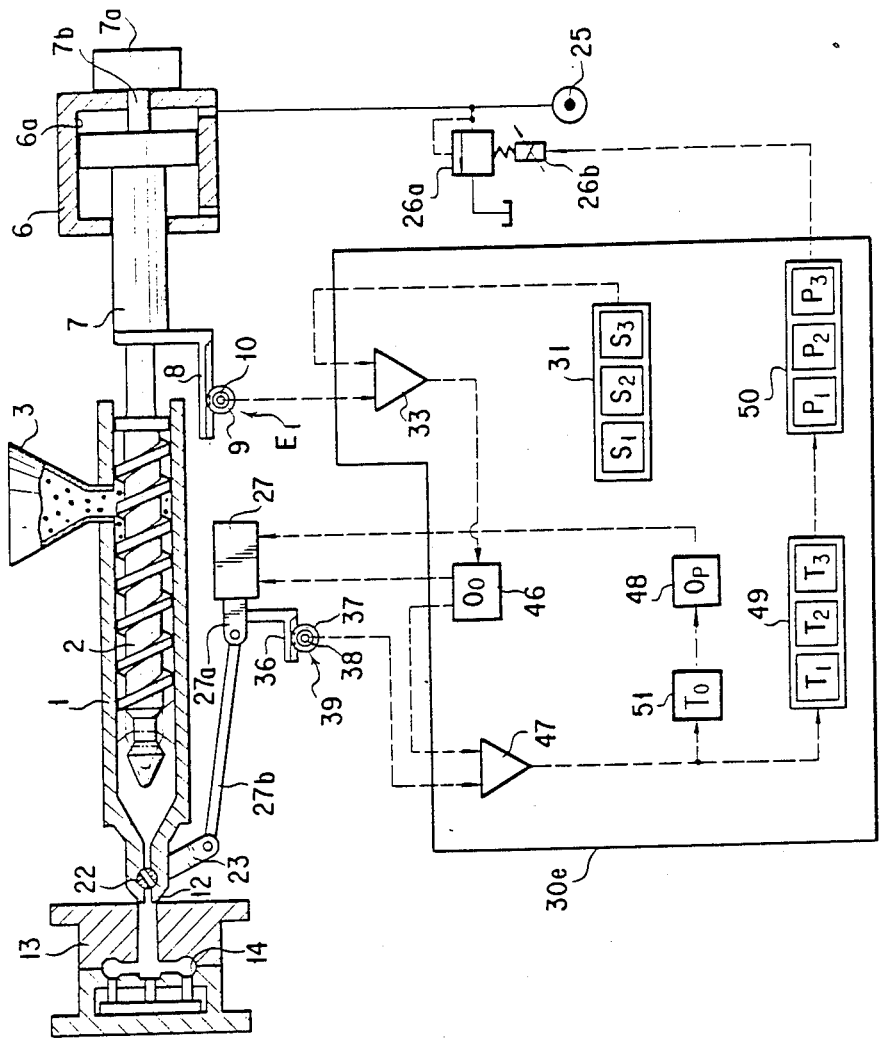
FIG. 13 is an overall schematic configuration explanatory view showing a seventh embodiment of an injection molding machine according to the present invention.

FIG. 13 shows the seventh embodiment wherein means 51 for setting the time-lag for opening nozzle valve is installed on the signal input side of the means 48 for setting the degree of opening of the nozzle valve during dwell pressure application inside a controller 30e, and arrangement is made such that when a command signal is transmitted by a second comparator 47, the means 51 for setting the time-lag for opening nozzle valve is actuated so that after the lapse of the preset time a command signal is transmitted by the setting means 51 to the means 48 for setting the degree of opening of nozzle valve to thereby increase the degree of opening of the nozzle valve 22.

Since the arrangement is made as mentioned above, at the time of change-over to the dwell pressure application process, the degree of opening of the nozzle valve 22 is kept at a value set by the means 46 for setting the degree of opening of nozzle valve before dwell pressure application only for the preset time from the time such a value is reached, and after the lapse of the preset time the degree of opening of the nozzle valve 22 reaches a value set by the means 48 for setting the degree of opening of nozzle valve during dwell pressure application. Therefore, it is possible to prevent the occurrence of such a phenomenon that during the preset time the pressure of the molten resin at the leading end of the screw drops and an excessive pressure is applied to the inside of the mold.

Further, the above-mentioned preset time is the period from the time of change-over to the dwell pressure application process to the time when the dwell pressure in the extensible pressure chamber 6a of the injection cylinder 6 reaches a value set by a dwell pressure setting means 51; that is to say, the pressure of the molten resin at the leading end of the screw reaches a preset value of dwell pressure.

Figure 14:
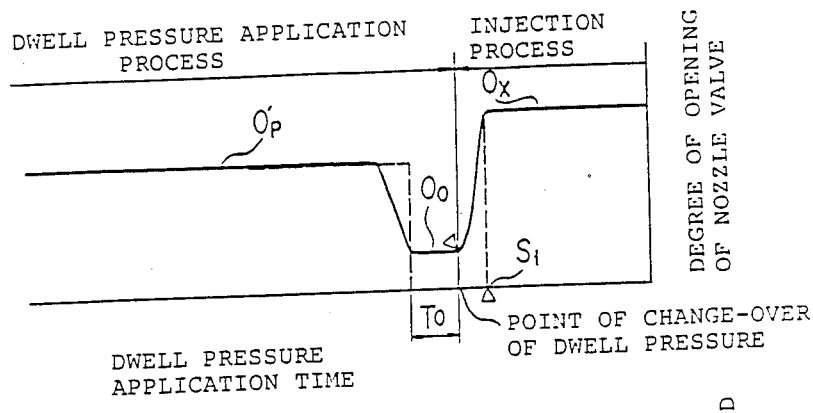
FIGS. 14, 15 and 16 are graphs showing the relationships between the dwell pressure application time and the degree of opening of the nozzle valve, the pressure of the molten resin in the leading end of the injection screw, and the dwell pressure force in the mold cavity, respectively, in the injection molding machine shown in FIG. 13.
Figure 15:
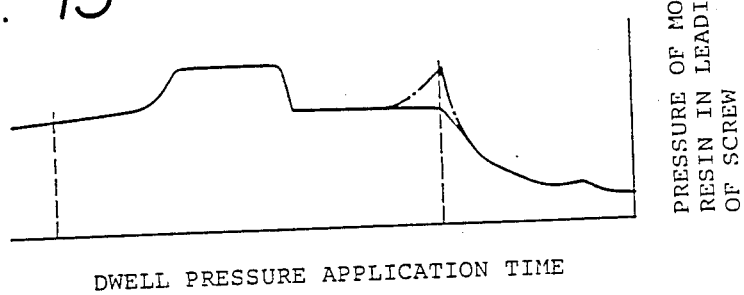
Figure 16:
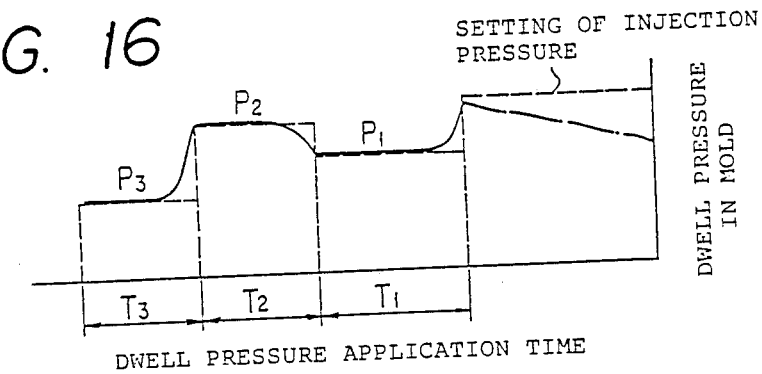

If, as shown, for example, in FIG. 14, the degree of opening of the nozzle value 22 is increased from $O_0$ to $O'_p$ after the lapse of time $T_0$ from the time the degree of opening of $O_0$ is reached, then the pressure of the molten resin at the leading end of the nozzle reaches a value corresponding to the preset value of dwell pressure smoothly as shown in FIG. 15, whilst the dwell pressure in the mold reaches a value corresponding to the preset value as shown in FIG. 16. However, if the nozzle valve 22 is opened immediately to the degree of opening of $O'_p$ before the lapse of the above-mentioned time $T_0$, a peak pressure will occur as shown by an imaginary line in FIG. 15.

Further, by setting a time-lag by means of the timelag setting means even at the time of stepwise change-over after the dwell pressure application so as not to make a rapid change-over, a smooth pressure change can be made at the time of change-over and the concurrence of a peak pressure can be prevented.

Further, it will be of course understood by those skilled in the art that, regarding the controllers 30a, 30b, 30c, 30d and 30e used in the above-mentioned third to seventh embodiments, each of the controllers 30d and 30e can be combined with the controllers 30a, 30b and 30c, respectively, for use as a controller for one injection molding machine.

Still further, all of the screw position detector $E_1$, the screw travel speed detector $E_2$ as well as the detector 39 for detecting the degree of opening of nozzle valve used in the above-mentioned embodiments use a rotary sensor 10 comprised of a rack and a pinion in combination, but such detectors are not to be limited to this construction. Instead, it is of course possible to use a linear potentiometer or a linear encoder and so forth.

The foregoing description is merely illustrative of preferred embodiments of the present invention, and the scope of the present invention is not to be limited thereto, but many changes or modifications of the invention will readily occur to those skilled in the art without departing from the scope of the present invention.

What we claim is:

1. An injection molding machine including a flow rate control device located between an injection screw mounted so that the injection screw may be rotated freely in a housing and reciprocated freely by an injection piston cylinder unit and an injection nozzle mounted in a leading end of the housing so as to inject molten resin from said injection nozzle into a mold cavity, said control device serving to control a rate of flow of the molten resin from said injection screw to said injection nozzle, said flow rate control device comprising:
   (a) a portion having first and second slender holes formed in the leading end of said housing, said slender holes having different lengths and connecting with an intermediate hole formed in the housing in which said injection screw is inserted with said nozzle;
   (b) a portion having a transverse hole located in an intermediate part of the slender holes and formed in said housing at right angles to the slender holes;
   (c) a sleeve fitted in said transverse hole and having first and second communication holes formed therein at positions corresponding to said first and second slender holes;

(d) first and second proportional action solenoids respectively mounted on both ends of said sleeve, and (e) first and second spools fitted in said sleeve in an opposed relationship at respective leading ends thereof, said spools having a small diameter recessed portion formed in their respective intermediate parts thereof and being connected at their base ends with said first and second proportional action solenoids, respectively.

2. An injection molding machine including a flow rate control device located between an injection screw mounted so that the injection screw may be rotated freely in a housing and reciprocated freely by an injection piston-cylinder unit and an injection nozzle mounted in a leading end of the housing so as to inject molten resin from said injection nozzle into a mold cavity, said control device serving to control a rate of flow of the molten resin from said injection screw to said injection nozzle, said flow rate control device comprising:

(a) a portion having a slender hole formed in a leading end of said housing so as to connect with an intermediate hole formed in the housing and in which said injection screw is inserted with said injection nozzle;

(b) a nozzle valve located in the intermediate part of said slender hole and mounted rotatably in the housing;

(c) an actuator for rotatively driving said nozzle valve so as to control the area of opening of said slender hole to increase and decrease said area; and (d) means for connecting the actuator with said nozzle valve; and an injection speed control means for controlling a degree of opening of said nozzle valve, said injection control means including an injection screw position detector connected with the piston rod of said injection piston-cylinder unit; an injection screw travel speed detector connected with said piston rod; and a controller for controlling the drive of said actuator while comparing the detection signals transmitted by said position and speed detectors, a preset injection screw position signal, and a preset injection screw travel speed signal.

3. The injection molding machine as set forth in claim 2, wherein said actuator is a hydraulic oil or pneumatic piston-cylinder unit.

4. The injection molding machine as set forth in claim 2, wherein said actuator is a proportional action solenoid.

5. The injection molding machine as set forth in claim 2, wherein said controller controls the degree of opening of said nozzle valve and, at the same time, controls the amount of pressurized fluid to be supplied into said injection piston-cylinder unit.

6. The injection molding machine as set forth in claim 2, wherein said injection speed control means includes a nozzle opening detector for detecting the degree of opening of said nozzle valve connected with a movable unit of said actuator; means for setting a nozzle valve change-over position; means for commanding change-over of the degree of opening of said nozzle valve and adapted to transmit a command signal to said actuator; means for setting the degree of opening of nozzle valve and arranged to transmit a setting signal to said means for commanding change-over of the degree of opening of nozzle valve; means for commanding change-over of speed of said injection screw; and a controller for controlling the drive of said actuator while comparing the detection signal transmitted by said injection screw position detector with the setting signal transmitted by said means for setting nozzle valve change-over position in order to actuate said means for commanding change-over of the degree of opening of nozzle valve and, at the same time, comparing the detection signal transmitted by said detector for detecting the degree of opening of nozzle valve with the setting signal transmitted by said means for setting the degree of opening of nozzle valve in order to actuate the means for commanding change-over of speed of injection screw.

7. The injection molding machine as set forth in claim 6, wherein said controller controls the degree of opening of said nozzle valve, and at the same time, controls the amount of the pressurized fluid to be supplied into said injection piston-cylinder unit.

8. The injection molding machine as set forth in claim 2, further comprising a dwell pressure control device arranged to transmit a control signal to said flow rate control device when said injection screw is located at a predetermined position to thereby allow said nozzle valve to have a predetermined degree of opening, and when the predetermined degree of opening is obtained, effect controls to allow pressure in an expansible pressure chamber of said injection piston-cylinder unit to reach a predetermined dwell pressure.

9. The injection molding machine as set forth in claim 8, wherein said dwell pressure control device includes an injection screw position detector connected with a piston rod of said injection piston-cylinder unit; a detector for detecting the degree of opening of nozzle valve connected with a movable unit of said actuator; means for setting position of injection screw; means for setting the degree of opening of nozzle valve before dwell pressure application arranged to transmit a setting signal to said actuator; means for setting the degree of opening of nozzle valve during dwell pressure application arranged to transmit a setting signal to said actuator; means for setting dwell pressure application time; means for setting dwell pressure arranged to receive an output signal from the means for setting dwell pressure application time; and a controller for controlling drive of said actuator while comparing a detection signal transmitted by said injection screw position detector with the setting signal transmitted by said means for setting position of injection screw in order to actuate the means for setting the degree of opening of nozzle valve before dwell pressure application and comparing the detection signal transmitted by said detector for detecting the degree of opening of nozzle valve with said setting signal transmitted by the means for setting the degree of opening of nozzle valve before dwell pressure application in order to actuate said means for setting the degree of opening of nozzle valve during dwell pressure application and said means for setting dwell pressure application time.

10. The injection molding machine as set forth in claim 9, wherein said controller controls the drive of said actuator and controls the amount of the pressurized fluid to be supplied into the expansible pressure chamber of said injection piston-cylinder unit.

11. The injection molding machine as set forth in claim 9, wherein said controller further includes a means for setting a time-lag for opening said nozzle valve installed on an input side of said means for setting the degree of opening of said nozzle valve during dwell pressure application, and arranged to receive an output signal transmitted by a comparator which serves to compare the detection signal transmitted by said detector for detecting the degree of opening of nozzle valve with the setting signal transmitted by said means for setting the degree of opening of said nozzle valve before dwell pressure application.

12. The injection molding machine as set forth in claim 11, wherein said controller controls the drive of said actuator and controls the amount of the pressurized fluid to be supplied into the expansible pressure chamber of said injection piston-cylinder unit.

* * * * *